United States Patent Office 3,205,643
Patented Sept. 14, 1965

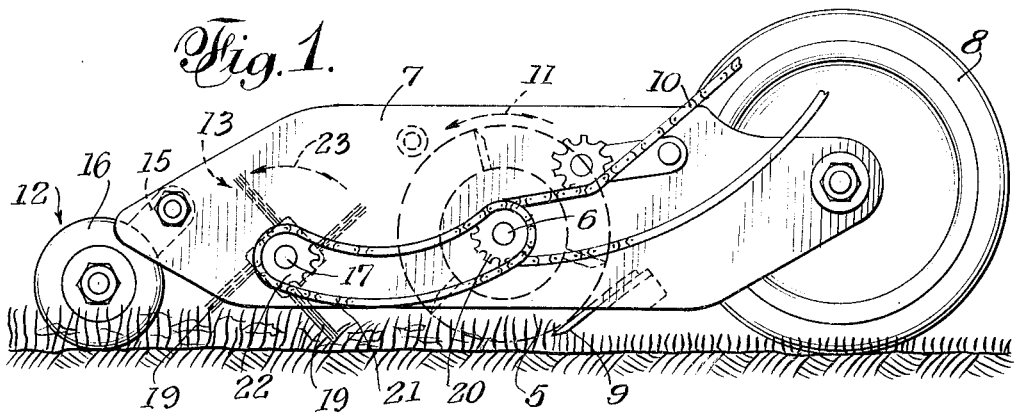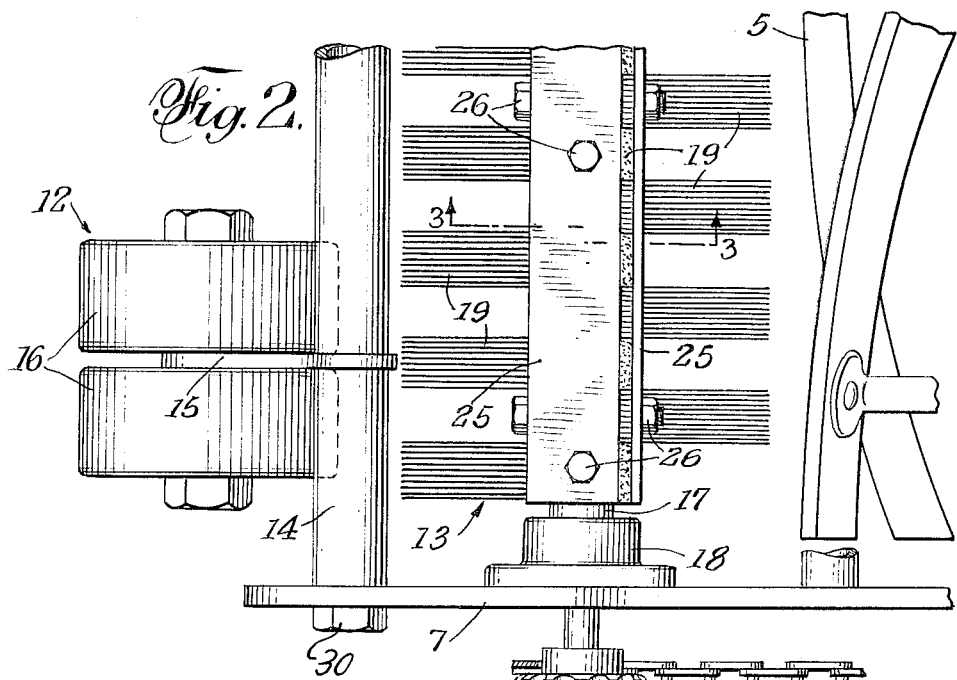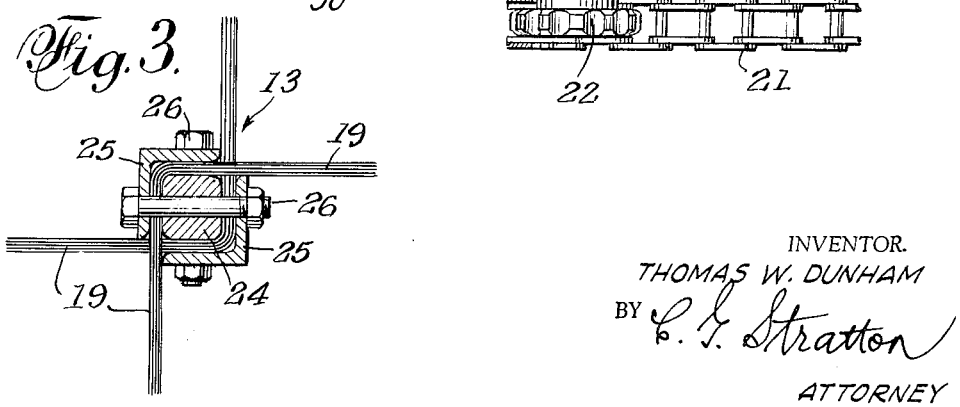

3,205,643
ATTACHMENT FOR LAWN MOWER
Thomas W. Dunham, 7431 Rosedale Highway,
Bakersfield, Calif.
Filed June 27, 1963, Ser. No. 290,995
2 Claims. (Cl. 56—26)

This invention relates to an attachment for a lawn mower and has for an object to provide means for preparing a lawn ahead of the cutting reel of the mower so the latter may more efficiently perform its grass-cutting function.

Another object of the invention is to provide an attachment, as above characterized, that, in addition to lifting the blades of grass for more efficient cutting thereof, catches leaves, twigs and other debris below the cutting level and, by sweeping the same into the path of the cutting reel, provides for improved lawn mowing.

A further object of the invention is to provide a mower attachment that is especially effective for directing long blades of grass to the cutting reel so that the latter may efficiently cut rather than pass over them.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a side elevational view of a mower provided with the improvements of the present invention.

FIG. 2 is an enlarged fragmentary plan view of said improvements.

FIG. 3 is a cross-sectional view as taken on the line 3—3 of FIG. 2.

FIG. 1, in exemplary form, shows a mower having a grass-cutting reel 5 that is mounted on an axle 6 journalled in the sides of a frame 7. Only one side of the frame is shown in FIGS. 1 and 2, it being clear that the opposite side thereof is similar. In this case, the frame 7 is mounted to track on rear wheels 8. The cutting reel is associated, in the usual manner, with a cutter bar 9 so that, whether propelled by hand or by an engine mounted on the frame 7, the reel 5 will cut grass over which the mower is moved in a forward direction, i.e., toward the left. The chain drive 10 represents means for rotating the axle 6 of the mower so the reel 5 will spin in the direction of the arrow 11 to cut grass.

The present improvements comprise, generally and in combination with the above-described mower, forward support wheel means 12, and sweeper means 13 between the reel 5 and the wheel means 12.

In this instance, the wheel means comprises a crossbar 14 extending between the sides of the frame 7, downwardly and forwardly directed arms 15, and support wheels 16 on the ends of said arms. In this manner, the mower frame 7 is supported and movable along the ground on the wheels 8 at the rear and 16 at the front.

The sweeper means 13 is shown as a transverse axle 17 parallel to the axle 6, journals 18 on opposite sides (one only being shown) mounting said axle in the frame 7, and a plurality of sweeper brushes 19 mounted on said axle in longitudinal arrangement along the axle 6 and forwardly of the cutting reel 5. Instead of the sweeper brushes 19 for sweeping leaves, lifting up long blades of grass for cutting and for catching debris and grass cuttings, tines or teeth may be substituted in cases where the present improvements are to be used for renovating a lawn, such as scarifying the same or pulling out and eradicating matted material and old growths. The term "sweeper means" is intended to include renovating means and the like. Said means is shown as driven from a sprocket wheel 20 on the axle 6 by a chain 21 that is trained over a sprocket wheel 22 on the axle 17, the drive being in the direction of arrow 23, the same direction as that of the cutting reel 5.

The sweeper means 13 comprises a square-sectional arbor 24 formed as part of axle 17 and over the faces of which the tufts of bristles comprising the brushes 19 are bent at their mid points alternately oppositely, as best seen in FIG. 3, and a pair of elongated angles 25 that engage over and clamp the bends in the brushes against the faces of said arbor so the brush ends of each tuft are at right angles to each other, and the ends of adjacent brushes are also at right angles to each other. Bolts 26 fasten the angles to the arbor and thereby clamp the brushes in place so the ends thereof extend, as shown, to form a transversely arranged series of sweeper portions.

By making the brushes long enough so the same sweep through the long grass either touching the ground or slightly spaced therefrom, as desired, said brushes are enabled to lift accumulations of debris in the grass and which may be at a level too low to be affected by the reel 5. As a consequence, said brushes not only raise up long blades of grass but sweep leaves and other debris toward the cutting reel so the same may be cut up thereby.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. Sweeper means adapted to be disposed forwardly of the grass-cutting reel of a lawn mower to sweep debris in the path of the reel therebeneath to be cut thereby, said reel being disposed on a transverse axis, said sweeper means comprising:
   (a) a square-sectioned axle,
   (b) a series of similar tufts of bristles bent around diagonally opposite corners of said axle in alternately opposite directions,
   (c) a pair of angle members cooperating with the axle to confine the bristle tufts adjacent of the bends therein,
   (d) means to fasten the angle members to the axle,
   (e) a frame connected to the axis of the reel and the axle of the sweeper means and mounting both said reel and sweeper means, and
   (f) wheels on the frame to support the same from the ground, the mentioned bristles being of such length that the ends thereof are in substantial engagement with the ground.

2. Sweeper means for cooperating with a grass-cutting reel and mounted in forward parallel relation to said reel, said means comprising:
   (a) a square-sectioned axle,
   (b) a driving connection from the reel to the axle to rotate them in the same direction, (c) a series of similar tufts of bristles bent around diagonally opposite corners of said axle in alternately opposite directions,
(d) a pair of angle members cooperating with the axle to confine the bristle tufts adjacent of the bends therein,
(e) said angles being in opposed relation, one engaged with bristle tufts bent over one axle corner and the other engaged with bristle tufts bent over the other axle corner,
(f) the bristles extending beyond the axle between adjacent edges of said angles, and
(g) means to support said axle from the ground, the tufts of bristles being of such length that the ends thereof are in substantial engagement with the ground.

References Cited by the Examiner

UNITED STATES PATENTS

| | | | |
|---|---|---|---|
| 886,406 | 5/08 | Rarig | 56—400 |
| 2,242,922 | 5/41 | Poynter | 56—400.02 |
| 2,722,795 | 11/55 | Warner | 56—400.02 X |
| 2,826,034 | 3/58 | Feuerlein | 56—400.02 |
| 3,094,830 | 6/63 | Leblanc | 56—27 X |

ANTONIO F. GUIDA, *Acting Primary Examiner*.

RUSSELL R. KINSEY, T. GRAHAM CRAVER, *Examiners*.